United States Patent
Tighe et al.

(10) Patent No.: US 7,842,426 B2
(45) Date of Patent: Nov. 30, 2010

(54) USE OF A POROUS MATERIAL IN THE MANIFOLDS OF A FUEL CELL STACK

(75) Inventors: Thomas W. Tighe, Bloomfield, MI (US); Jon P. Owejan, Honeoye, NY (US); Thomas A. Trabold, Pittsford, NY (US)

(73) Assignee: GM Global Technology Operations, Inc., Detroit, MI (US)

( * ) Notice: Subject to any disclaimer, the term of this patent is extended or adjusted under 35 U.S.C. 154(b) by 1043 days.

(21) Appl. No.: 11/562,729

(22) Filed: Nov. 22, 2006

(65) Prior Publication Data

US 2008/0118809 A1  May 22, 2008

(51) Int. Cl.
*H01M 2/00* (2006.01)
*H01M 2/14* (2006.01)
(52) U.S. Cl. .................. 429/414; 429/456; 429/457; 429/458
(58) Field of Classification Search ............. None
See application file for complete search history.

(56) References Cited

U.S. PATENT DOCUMENTS

| 4,876,162 | A | 10/1989 | McElroy |
| 6,605,380 | B2 | 8/2003 | Chen et al. |
| 2005/0123420 | A1* | 6/2005 | Richter et al. ............ 417/413.2 |
| 2006/0099470 | A1 | 5/2006 | Rapaport et al. |
| 2007/0166587 | A1* | 7/2007 | Nagao et al. ................... 429/26 |

FOREIGN PATENT DOCUMENTS

| JP | 2001-118596 | * | 4/2001 |
| JP | 2001 118596 | A | 4/2001 |

OTHER PUBLICATIONS

Anonymous, Pump To Remove Water From A Wick, Pub. No. 494084, O.G. Jun. 2005, Research Disclosure, p. 742.

* cited by examiner

*Primary Examiner*—Stephen J. Kalafut
*Assistant Examiner*—Angela J. Martin
(74) *Attorney, Agent, or Firm*—Fraser Clemens Martin & Miller LLC; J. Douglas Miller

(57) ABSTRACT

A fuel cell stack is disclosed that utilizes a porous material internally disposed in the fuel cell outlet manifolds, wherein the porous material facilitates the transport of liquid water from the plate outlets thereby minimizing the accumulation of liquid water in the fuel cell stack.

19 Claims, 4 Drawing Sheets

USE OF A POROUS MATERIAL IN THE MANIFOLDS OF A FUEL CELL STACK

FIELD OF THE INVENTION

The invention relates to a fuel cell stack utilizing a porous material disposed in the fuel cell manifolds, wherein the porous material facilitates the transport of liquid water from fuel cell channels, thereby minimizing the accumulation of liquid water in the fuel cell stack.

BACKGROUND OF THE INVENTION

Fuel cell power systems convert a fuel and an oxidant to electricity. One type of fuel cell power system employs use of a proton exchange membrane (hereinafter "PEM") to catalytically facilitate reaction of fuels (such as hydrogen) and oxidants (such as air or oxygen) to generate electricity. The PEM is a solid polymer electrolyte that facilitates transfer of protons from the anode to the cathode in each individual fuel cell of the stack of fuel cells normally deployed in a fuel cell power system.

In a typical fuel cell assembly (stack) within a fuel cell power system, individual fuel cells provide channels through which various reactants and cooling fluids flow. Fuel cell plates are typically designed with serpentine flow channels. Serpentine flow channels are desirable as they effectively distribute reactants over the active area of an operating fuel cell, thereby maximizing performance and stability. Movement of water from the channels to outlet manifolds of the fuel cell plates is caused by the flow of the reactants through the fuel cell. Drag forces pull the liquid water through the channels until the liquid water exits the fuel cell through the outlet manifold. However, when the fuel cell is operating at a lower power output, the velocity of the gas flow is too to low produce an effective drag force to transport the liquid water, and the liquid water accumulates in the flow channels.

A further limitation of utilizing gas flow drag forces to remove the liquid water is that the water encounters various surface irregularities with high or low surface energy or pinning points on the flow channel surfaces. Because the drag forces may not be strong enough to effectively transport the liquid water, the pinning points may cause the water to accumulate and pool, thereby stopping the water flow. Such pinning points are those commonly located where the channel outlets meet the fuel cell stack manifold.

Additionally, some current fuel cell assemblies utilize plates having hydrophilic surfaces. Water has been observed to form a film on the surface of the material that accumulates at the outlet of the flow channels and the perimeter of the plates. The water film can block the gas flow, which in turn reduces the driving force for removing liquid water and thus militates against the removal of the liquid water from the fuel cell stack. In the case of a fuel cell plate with a mildly hydrophobic surface, water has been observed to form large drops that protrude into the fuel cell stack outlet manifold blocking the exits of the channels of the fuel cell plates. The droplets are observed to remain at the plate edge until they can be intermittently removed by gas shear. The accumulation of water can cause gas flow blockages or flow imbalances that can have negative impacts on the performance of the stack.

It would be desirable to develop a fuel cell stack with an improved means for removing liquid water from fuel cell gas flow channels of the fuel cell stack, to minimize the accumulation of liquid water within the fuel cell stack.

SUMMARY OF THE INVENTION

Concordant and congruous with the present invention, a fuel cell stack with an improved means for removing liquid water from fuel cell flow channels of the fuel cell stack, to minimize the accumulation of liquid water within the fuel cell stack, has been discovered.

In one embodiment, the fuel cell assembly comprises a fuel cell stack including a plurality of fuel cell plates, wherein each plate includes at least one aperture formed therein, the apertures of said fuel cell plates substantially aligned to form a manifold; and a porous material disposed in the manifold, wherein the porous material is adapted to facilitate the flow of water from the fuel cell plates, through the porous material, and out of said fuel cell stack.

In another embodiment, the fuel cell assembly comprises a fuel cell stack including a plurality of fuel cell plates, wherein each plate includes at least two apertures formed therein, the apertures of said fuel cell plates substantially aligned to form an inlet manifold and an outlet manifold; and a porous material disposed in the manifold, wherein the porous material is adapted to facilitate the flow of water from the fuel cell plates, through the porous material, and out of said fuel cell stack through the manifold.

In another embodiment, the fuel cell assembly comprises a fuel cell stack including a plurality of fuel cell plates, wherein each plate includes at least two apertures formed therein, the apertures of said fuel cell plates substantially aligned to form an inlet manifold and an outlet manifold; a porous material disposed in the manifold, wherein the porous material is adapted to facilitate the flow of water from the fuel cell plates, through the porous material, and out of said fuel cell stack through the manifold; and a porous support adapted to maintain the position of said porous material against an inner surface of the manifold.

DESCRIPTION OF THE DRAWINGS

The above, as well as other advantages of the present invention, will become readily apparent to those skilled in the art from the following detailed description of a preferred embodiment when considered in the light of the accompanying drawings in which.

DESCRIPTION OF THE PREFERRED EMBODIMENT

The following detailed description and appended drawings describe and illustrate various exemplary embodiments of the invention. The description and drawings serve to enable one skilled in the art to make and use the invention, and are not intended to limit the scope of the invention in any manner.

Figure 1:
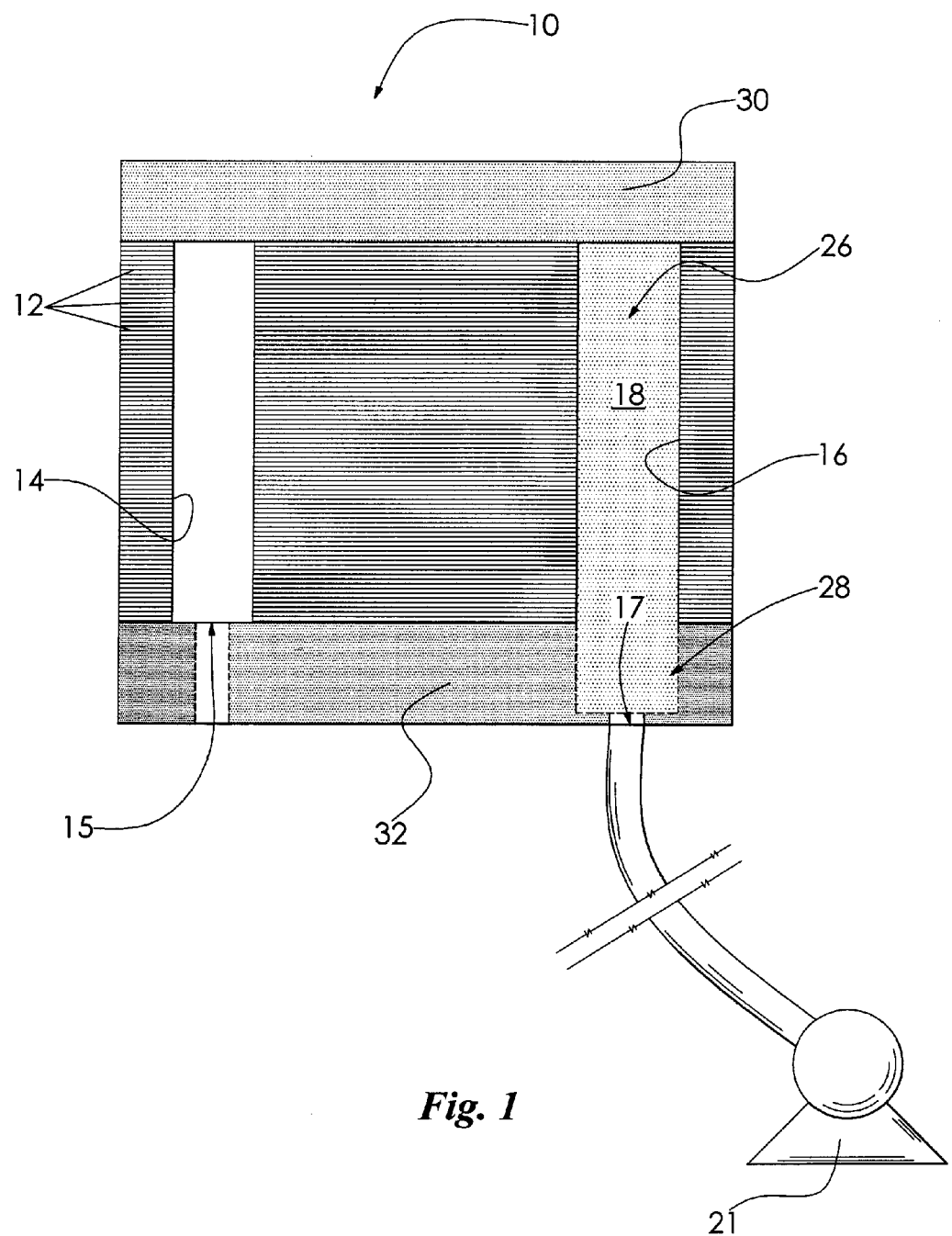
FIG. 1 is a cross-sectional view of a fuel cell stack incorporating a porous material in a fuel cell stack manifold according to an embodiment of the invention.
Figure 2:
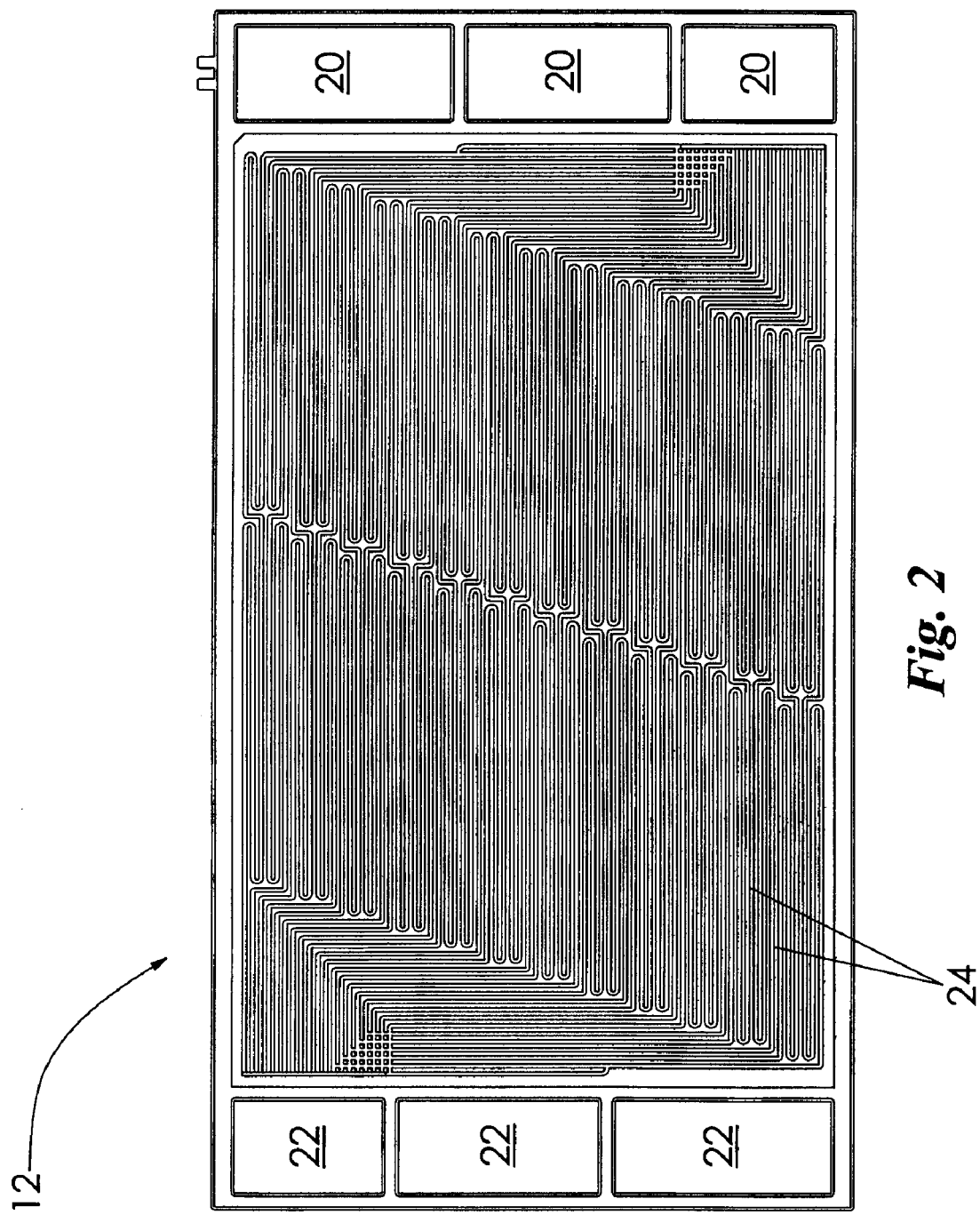
FIG. 2 is a top plan view of a fuel cell plate illustrative of the fuel cell plates of the fuel cell stack of the present invention.

FIG. 1 shows a fuel cell assembly 10 including a plurality of stacked fuel cell plates 12, an inlet manifold 14, an outlet manifold 16, and a porous material 18. FIG. 2 shows a top view of a typical fuel cell plate 12 including three inlet apertures 20, three outlet apertures 22, and a plurality of flow channels 24. It is understood that the flow channels 24 include the channels disposed on a face of the fuel cell plate 12 as well as the gas passages disposed intermediate the faces of the fuel cell plate 12. It is also understood that the material of construction, size, shape, quantity, and type of plates 12 in the fuel cell assembly 10, and the configuration of the fuel cell plates 12 within the assembly 10, may vary based on design parameters such as the amount of electricity to be generated, the size of the machine to be powered by the fuel cell assembly 10, the volumetric flow rate of gases through the fuel cell assembly 10, and other similar factors, for example. It is also understood that the plate 12 shown in FIG. 2 may be used for an anode side (not shown) or for a cathode side (not shown) of the fuel cell assembly 10. Further, it is understood that the plate 12 may have any number of inlet apertures 20 and outlet apertures 22, as desired. As shown, the flow channels 24 are undulated, however, it is understood that the flow channels 24 may be substantially linear, serpentine, or other configuration, as desired.

The inlet manifold 14 includes an inlet 15. The inlet manifold 14 is formed in the fuel cell assembly 10 by the inlet apertures 20 of the fuel cell plates 12. The plates 12 are stacked with the inlet aperture 20 of each plate 12 substantially aligned with the inlet aperture 20 of an adjacent plate or plates 12. It is understood that the diameter, quantity, and length of the inlet manifold 14 will depend on the size and quantity of inlet apertures 20 in the plates 12 and the number of plates 12 stacked in the fuel cell assembly 10.

The outlet manifold 16 includes an outlet 17. The outlet manifold 16 is formed in the fuel cell assembly 10 by the outlet apertures 22 of the fuel cell plates 12. The plates 12 are stacked with the outlet aperture 22 of each plate 12 substantially aligned with the outlet aperture 22 of an adjacent plate or plates 12. It is understood that the diameter, quantity, and length of the outlet manifold 16 will depend on the size and quantity of outlet apertures 22 in the plates 12 and the number of plates 12 stacked together in the fuel cell assembly 10.

Figure 3:
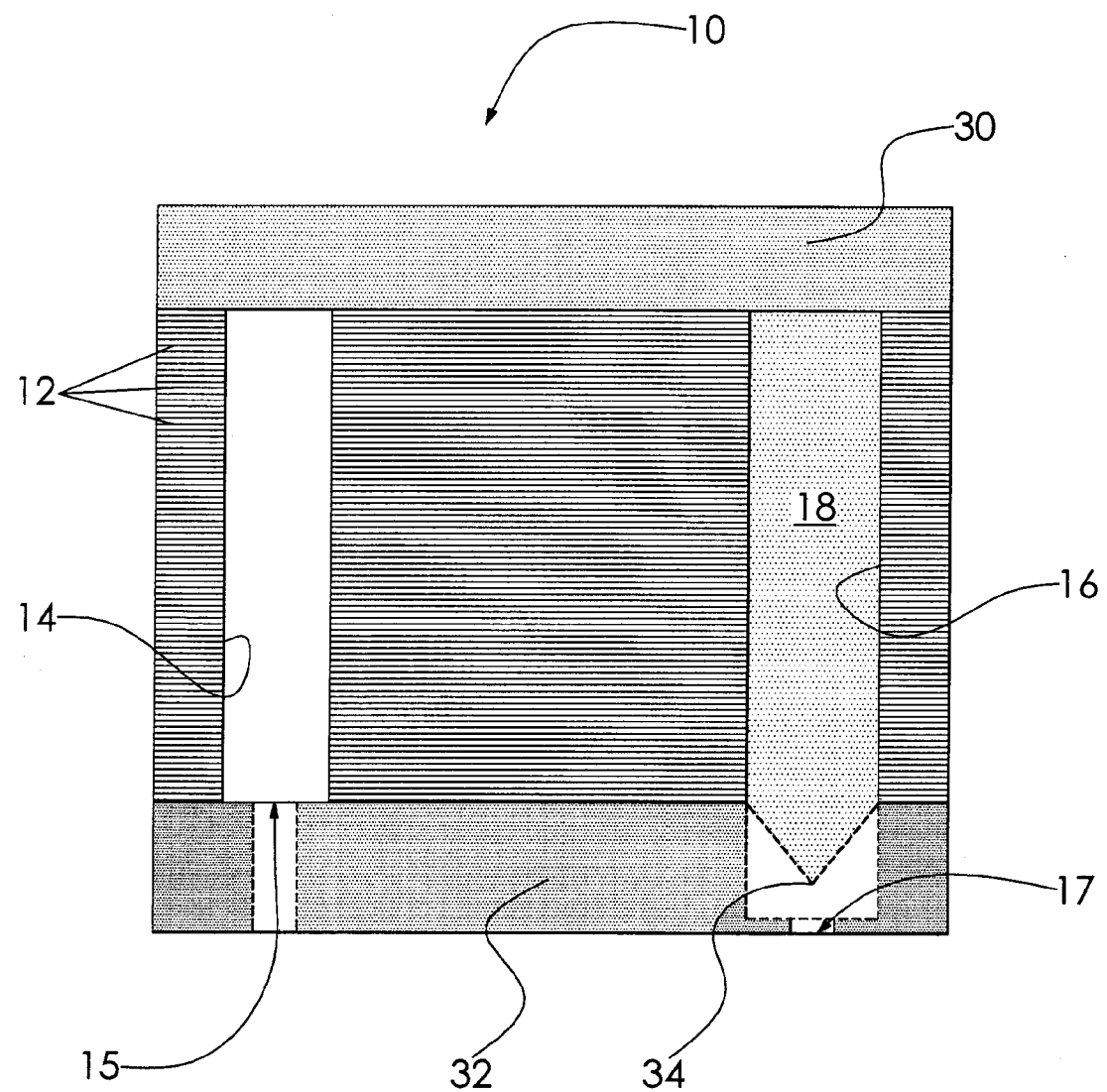
FIG. 3 is a cross-sectional view of a fuel cell stack incorporating a porous material forming a point in a fuel cell stack manifold according to another embodiment of the invention.

In the embodiment shown, the porous material 18 is a non-conductive foam having a first end 26 and a second end 28. The porous material 18 may also include a hydrophilic coating (not shown). The first end 26 of the porous material 18 is positioned adjacent a dry end compression plate 30 of the fuel cell stack. The second end 28 of the porous material 18 has a substantially flat configuration and extends beyond a lower extremity of the fuel cell plates 12 of the assembly 10. Alternatively, the second end 28 of the porous material 18 may form a point 34, as illustrated in FIG. 3, have a rounded shape, or other shape, as desired. As shown in FIG. 1, the porous material 18 substantially fills the outlet manifold 16 and extends through the entire length of the outlet manifold 16 and into a portion of the wet end compression plate 32. It is understood that the porous material 18 may extend through the wet end compression plate 30, if desired. It is further understood that the porous material 18 may fill only a portion of the outlet manifold 16 and not extend into the wet end compression plate 32. It is also understood that the porous material 12 may be disposed in an anode side outlet manifold (not shown), a cathode side outlet manifold (not shown), or both anode and cathode outlet manifolds. Further, it is understood that the porous material 18 may be any conductive or non-conductive open cell porous material, such as a fibrous material and a sponge or an assembly of a plurality of porous materials, for example. The porous material 18 has a hydrophilic coating such as silicon oxide ($SiO_x$) or other chemical coating having hydrophilic characteristics. Alternatively, the porous material 18 may be provided without a hydrophilic treatment. The porous material 18 may also be of constant pore size and porosity, or the porous material 18 may have a varying pore size. For example, the porous material 18 may have a higher density with small pore sizes where the fuel cell plates 12 abut the porous material 18 and a lower density with larger pore sizes throughout the remainder of the porous material 18 to reduce flow resistance.

Generally, during operation of a fuel cell power system, a stream of hydrogen is fed into the anode side of the fuel cell assembly 10. Concurrently, a stream of oxygen is fed into the cathode side of the fuel cell assembly 10. On the anode side, the hydrogen in the hydrogen stream is catalytically split into protons and electrons. The oxidation half-cell reaction is represented by: $H_2 \leftrightarrow 2H^+ + 2e^-$. In a polymer electrolyte membrane fuel cell, the protons permeate through the membrane to the cathode side. The electrons travel along an external load circuit to the cathode side creating the current of electricity of the fuel cell assembly 10. On the cathode side, the oxygen in the oxidant stream reacts with the protons permeating through the membrane and the electrons from the external circuit to form water molecules. This reduction half-cell reaction is represented by: $4H^+ + 4e^- + O_2 \leftrightarrow 2H_2O$. Anode exhaust from the anode side flows through a backpressure control valve (not shown) to a combustor, or is alternatively recycled back to the anode inlet manifold. Cathode exhaust from the cathode side flows through a second backpressure control valve (not shown) to the combustor or to the ambient environment. A control module (not shown) regulates the conditions of the hydrogen stream, oxygen stream, and exhaust streams by operating various control valves (not shown), backpressure control valves (not shown), and compressors (not shown) in response to signals from pressure sensors (not shown) and electrical power sensors (not shown) connected to the fuel cell assembly 10.

When the invention according to a first embodiment is in operation, the above reactions take place within the fuel cell assembly 10, and droplets of liquid water are formed in the channels 24 of the fuel cell plates 12 on the cathode sides of the fuel cell assembly 10. Some water also may be transported into the anode flow channels, or may form in the anode channels via condensation resulting from consumption of the hydrogen. It is understood that the operation as described herein for the cathode side is similar to operation for the anode side of the fuel cell assembly 10. The air stream flowing through the cathode side causes the water droplets to flow through the channels 24, toward the outlet manifold 16. Water vapor also flows towards the outlet manifold 16. Once the water droplets contact the porous material 18, the water is wicked away from the channels 24 by the porous material 18. The hydrophilic coating on the porous material 18 will provide additional capillary force to attract the water droplets and the condensed water vapor. The exhaust gas streams also pass through the porous material 18, and through the outlet manifold 16.

It is expected that two different water transport mechanisms may be utilized to remove the water from the channels 24, depending on the porous material 18 used. First, the porous material 18 may form a network of open continuous pores that are capable of utilizing capillary forces to move the water through the pores. A porous material 18 having varying pore sizes is provided. A portion of the porous material 18 having a higher density of pores is disposed immediately adjacent the fuel cell plates 12. The high density pore portion provides small pore sizes in the porous material 18 to facilitate wicking of the water out of the fuel cell plates 12. The remaining portion of the porous material 18 has a lower density of pores that provides larger pore sizes to provide a lower pressure drop region for the gas streams to flow through with a minimal pressure drop.

Second, the mechanism to remove water using the porous material 18 includes pores having a larger size. The porous material 18 is produced from a hydrophilic material and the liquid water and condensed water vapor form a film (not shown) on the fibers of the porous material 18. The film forms a continuous path along the fibers from the channels 24 of the fuel cell plates 12 to the outlet manifolds 16 and to the outlet 17 of the fuel cell assembly 10.

Both of the water transport mechanisms described above relies on gravity to remove the water from the porous material 18. It is desirable, though not necessary, for a portion of the porous material 18 to be saturated to create a sufficient head to cause the water to drain from the porous material 18. The head height varies inversely with the average pore size of the porous material. As shown in FIG. 1, the portion of the porous material 18 extending into the wet end compression plate 32 is the saturated portion. It is desirable that the saturated portion be below the fuel cell plates 12 rather than immediately adjacent any plates 12, to minimize a pressure drop through the porous material 18 or blockage of the channels 24. If a saturated portion is not created in the porous material 18, a peristaltic pump 21 may used with the fuel cell assembly 10 to cause the water to flow through the assembly 10 and out of the porous material 18. The peristaltic pump 21 may be a peristaltic pump such as the one disclosed by Anonymous, Pump to Remove Water from a Wick, Pub. No. 494084, O.G. June 2005. During operation of the fuel cell assembly 10, it is anticipated that portions of an operational cycle will result in the outlet gas streams being less than saturated, here evaporation will aid water removal from the porous material 18.

Figure 4:
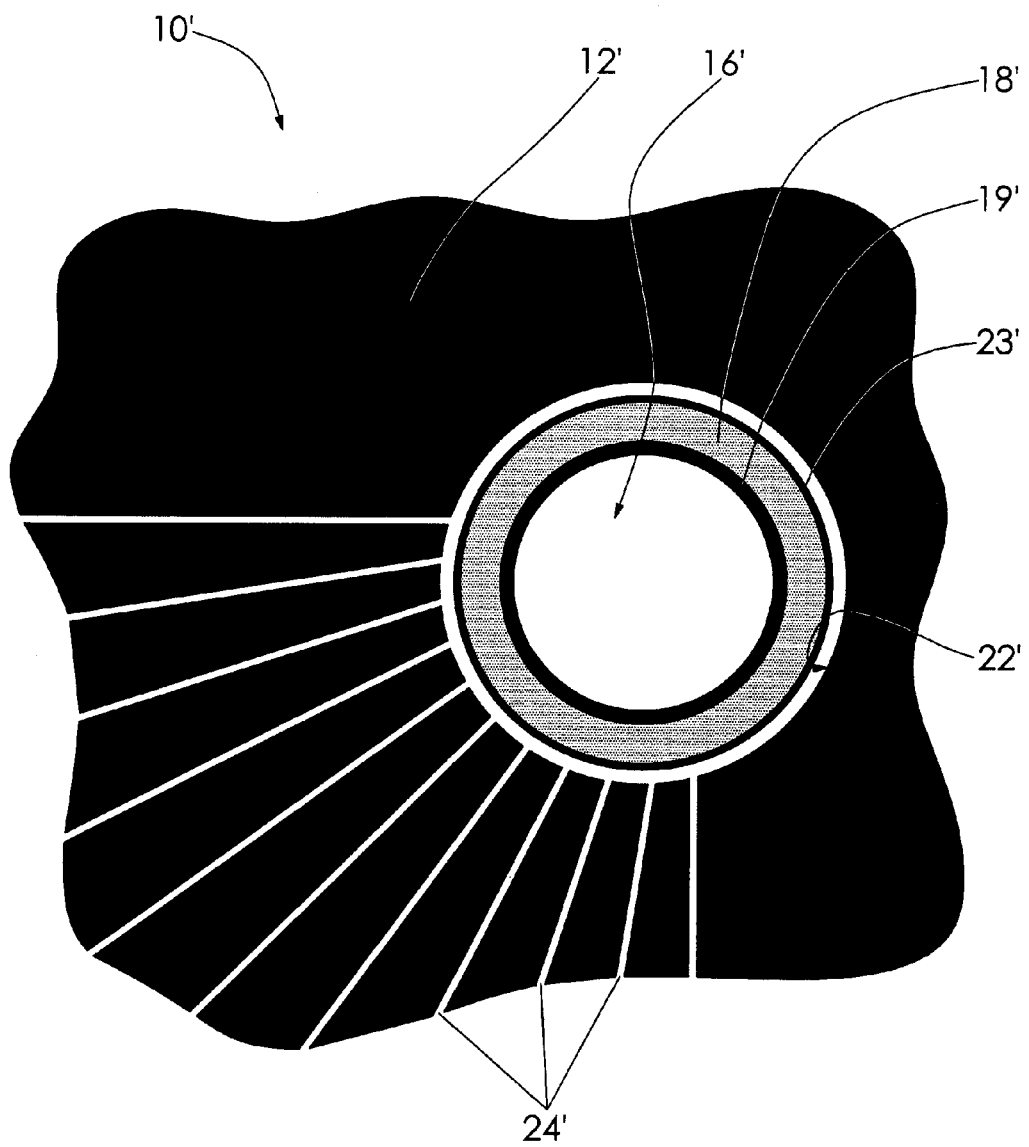
FIG. 4 is a fragmentary top plan view of a manifold of a fuel cell stack incorporating a porous support structure according to another embodiment of the invention.

FIG. 4 shows a portion of a fuel cell assembly 10' including a plurality of stacked fuel cell plates 12', an inlet manifold (not shown), an outlet manifold 16', a porous material 18', and a porous or perforated support 19'. The fuel cell plate 12', similar to the plate 12 shown in FIG. 1, includes two inlet apertures (not shown), two outlet apertures 22' and a plurality of flow channels 24'. It is understood that the material of construction, size, shape, quantity, and type of plates 12' in the fuel cell assembly 10', and configuration of the fuel cell plates 12' within the fuel cell assembly 10' may vary based on design parameters such as the amount of electricity to be generated, the size of the machine to be powered by the fuel cell assembly 10', the volumetric flow rate of gases through the fuel cell assembly 10', and other similar factors, for example. It is also understood that the plate 12' may be disposed on an anode side (not shown) or on a cathode side (not shown) of the fuel cell assembly 10'. Further, it is understood that the plate 12' may have any number of inlet apertures and outlet apertures 22', as desired. As shown, the flow channels 24' are substantially linear, however, it is understood that the flow channels 24' may be undulated, serpentine, or have another configuration, as desired.

The inlet manifold includes an inlet (not shown). The inlet manifold is formed in the fuel cell assembly 10' by the inlet apertures 20' of the fuel cell plates 12'. The plates 12' are stacked one on top of another with the inlet aperture of each plate 12' substantially aligned with the inlet aperture of an adjacent plate 12'. It is understood that the diameter, quantity, and length of the inlet manifold 14' will depend on the size and quantity of inlet apertures in the plates 12' and the number of plates 12' stacked together in the fuel cell assembly 10'.

The outlet manifold 16' includes an outlet (not shown). The outlet manifold 16' is formed in the fuel cell assembly 10' by the outlet apertures 22' of the fuel cell plates 12'. The plates 12' are stacked with the outlet aperture 22' of each plate 12' substantially aligned with the outlet aperture 22' of an adjacent plate or plates 12'. It is understood that the diameter, quantity, and length of the outlet manifold 16' will depend on the size and quantity of outlet apertures 22' in the plates 12' and the number of plates 12' stacked together in the fuel cell assembly 10'.

In the embodiment shown, the porous material 18' is a non-conductive foam having a hydrophilic surface 23'. As shown in FIG. 4, the porous material 18' is disposed radially inward of an inner surface of the outlet manifold 22'. The porous material 18' may extend through a portion of the outlet manifold 16' or the entire manifold 16' and into a portion of the wet end compression plate (not shown), as desired. The porous material 18' may not extend around the entire perimeter of the manifold 22' but may press against a portion of the manifold 22' to support the required water flow. It is understood that the porous material 12' may disposed in an anode side outlet manifold, a cathode side outlet manifold, or both anode and cathode outlet manifolds. It is also understood that the porous material 18' may be any conductive or non-conductive open cell porous material, such as a fibrous material, a sponge, and an assembly of a plurality of porous materials, for example. The hydrophilic surface 23' on the porous material 18' may be a silicon oxide ($SiO_x$) or other chemical treatments or coatings that yield hydrophilic surface characteristics. Alternatively, the porous material 18' may be provided without a coating. The porous material 18' may also be of constant pore size, or the porous material 18' may have varying pore sizes. The porous material 18' may have a higher density where the fuel cell plates 12' abut the porous material 18' and a lower density throughout the remainder of the porous material 18', for example.

In the embodiment shown in FIG. 4, the porous support 19' is a perforated tube disposed radially inward of the porous material 18' in the outlet manifold 16'. The porous support 19' maintains a position of the porous material 18'. It is understood that the porous support 19' could be a plastic screen or other similar structure capable of maintaining the position of the porous material 18' against an inner surface of the manifold 16'. It is also understood that the porous support 19' may be conductive or non-conductive as desired. Further, it is understood that the porous support 19' may have hydrophilic surface properties such as that provided by a silicon oxide ($SiO_x$) coating, for example.

When the invention according to the embodiment shown in FIG. 4 is in operation, the above reactions take place within the fuel cell assembly 10', and droplets of liquid water are formed in the channels 24' of the fuel cell plates 12'. It is understood that the operation as describe herein for the cathode side is similar to operation for the anode side of the fuel cell assembly 10'. The air stream flowing through the cathode side causes the water droplets to flow through the channels 24', toward the outlet manifold 16'. Water vapor also flows towards the outlet manifold 16'. Once the water droplets or vapor contact the porous material 18', the water is wicked away from the channels 24' by the porous material 18'. The hydrophilic coating on the porous material 18' acts to attract the water droplets and to transport the water to the outlet manifold 16' of the fuel cell assembly 10'. It is understood that water from the water vapor may condense in the porous material 18'. Condensation of the vapor causes an additional pressure drop in the fuel cell assembly 10'. It is understood that any condensation that occurs is incidental to the invention, however alteration of the dimensions, configuration, and materials used for the porous material 18', fuel cell plates 12', and other components, as well as other design considerations, may be made to compensate for the additional pressure drop. The exhaust gas streams also pass through the porous material 18', the porous support 19' and through the outlet manifold 16'. The porous support 19' promotes a low pressure drop to facilitate the flow of the exhaust gases through the porous material 18' and manifold 16'.

It is expected that two different water transport mechanisms may be utilized to remove the water from the channels 24' depending on the porous material 18' used. First, the porous material 18' may form a network of open continuous pores that are capable of utilizing capillary forces to move the water through the pores of the porous material 18'. A porous material 18' having a varying density is provided. A portion of the porous material 18' having a higher density is disposed immediately adjacent the fuel cell plates 12'. The high density portion provides small pore sizes in the porous material 18' to facilitate wicking of the water. The remaining portion of the porous material 18' has a lower density that provides larger pore sizes to provide a lower pressure drop region for the gas streams to flow through with a minimal pressure drop.

Second, the porous material 18' includes pores having a larger size. The porous material 18' is produced from a hydrophilic material or treated to have a hydrophilic surface property and the liquid water forms a film (not shown) on the fibers of the porous material 18'. The film forms a continuous path along the fibers from the exits of the fuel cell plates 12' to the outlet manifolds 16' and to the outlet 17' of the fuel cell assembly 10'. Water is removed by dipping off the lowest point of the porous material 18'.

Both of the water transport mechanisms described above rely on gravity to remove the water from the porous material 18'. It is desirable, though not necessary, for a portion of the porous material 18' to be saturated to create a sufficient head to cause the water to drain from the porous material 18'. A portion of the porous material 18' may extend into the wet end compression plate 32'. The portion of the porous material 18' may be the saturated portion. It is desirable that the saturated portion is below the fuel cell plates 12' rather than immediately adjacent any plates 12', to minimize a pressure drop through the porous material 18' or blockage of the channels 24'. If a saturated portion is not created in the porous material 18', a peristaltic pump may used with the fuel cell assembly 10' to cause the water to flow through the assembly 10' and out of the porous material 18'. The peristaltic pump 21 may be a peristaltic pump such as the one disclosed by Anonymous, Pump to Remove Water from a Wick, Pub. No. 494084, O.G. June 2005. Water is removed by dipping off the lowest point of the porous material 18'.

From the foregoing description, one ordinarily skilled in the art can easily ascertain the essential characteristics of this invention and, without departing from the spirit and scope thereof, can make various changes and modifications to the invention to adapt it to various usages and conditions.

What is claimed is:

1. A fuel cell assembly comprising:
a fuel cell stack including a plurality of fuel cell plates, wherein each plate includes at least one aperture formed therein, the apertures of said fuel cell plates substantially aligned to form a manifold; and
a porous material disposed in the manifold abutting an inner surface of the manifold at an edge of the fuel cell plates adjacent flow channels formed therein, wherein the porous material facilitates the flow of water from the fuel cell plates, through the porous material, and out of said fuel cell stack.

2. The fuel cell assembly of claim 1, wherein said porous material is one of a hydrophilic foam and an expanded fibrous material.

3. The fuel cell assembly of claim 1, wherein said porous material is non-conductive.

4. The fuel cell assembly of claim 1, wherein said porous material has varying pore sizes.

5. The fuel cell assembly of claim 1, wherein said porous material has a hydrophilic coating.

6. The fuel cell assembly of claim 5, wherein the hydrophilic coating is a silicon oxide.

7. The fuel cell assembly of claim 1, further comprising a peristaltic pump adapted to force the liquid water through said porous material, and out of said fuel cell stack through the manifold.

8. The fuel cell assembly of claim 1, wherein said porous material substantially fills the manifold.

9. The fuel cell assembly of claim 1, further comprising one of a porous support and a perforated support adapted to maintain the position of said porous material against the plurality of the apertures of said fuel cell plates.

10. The fuel cell assembly of claim 9, wherein said porous support is one of a plastic screen and a plastic tube.

11. The fuel cell assembly of claim 1, wherein one end of said porous material forms a point.

12. A fuel cell assembly comprising:
a fuel cell stack including a plurality of fuel cell plates, wherein each plate includes at least two apertures formed therein, the apertures of said fuel cell plates substantially aligned to form an inlet manifold and an outlet manifold; and
a non-conductive porous material disposed in the outlet manifold abutting an inner surface of the manifold at an edge of the fuel cell plates adjacent flow channels formed therein, wherein the porous material facilitates the flow of water from the fuel cell plates, through the porous material, and out of said fuel cell stack through the outlet manifold.

13. The fuel cell assembly of claim 12, further comprising a porous support adapted to maintain the position of said porous material against the plurality of the apertures forming the outlet manifold.

14. The fuel cell assembly of claim 12, wherein said porous material is one of a foam and an expanded fibrous material.

15. The fuel cell assembly of claim 12, wherein said porous material has a hydrophilic coating.

16. The fuel cell assembly of claim 12, wherein said porous support is one of a plastic screen and a plastic tube.

17. A fuel cell assembly comprising:
a fuel cell stack including a plurality of fuel cell plates, wherein each plate includes at least two apertures formed therein, the apertures of said fuel cell plates substantially aligned to form an inlet manifold and an outlet manifold;
a porous material disposed in the outlet manifold, said porous material having a portion with a first pore density and a second portion with a second pore density greater than the first pore density, the second portion abutting an inner surface of the manifold at an edge of the fuel cell plates adjacent flow channels formed therein, wherein the porous material facilitates the flow of water from the fuel cell plates, through the porous material, and out of said fuel cell stack through the outlet manifold.

18. The fuel cell assembly of claim 17, wherein said porous material is an assembly composed of a plurality of different porous materials.

19. The fuel cell assembly of claim 1, wherein said porous material includes a portion with a first pore density and a second portion with a second pore density greater than the first pore density, the second portion abutting an inner surface of the manifold at an edge of the fuel cell plates adjacent flow channels formed therein.

* * * * *